United States Patent [19]

Dholakia

[11] 4,077,050

[45] Feb. 28, 1978

[54] VIDEO DISC PLAYER EMPLOYING A SPRING LOADED STYLUS APPARATUS

[75] Inventor: Anil Ramniklal Dholakia, East Windsor, N.J.

[73] Assignee: RCA Corporation, New York, N.Y.

[21] Appl. No.: 667,307

[22] Filed: Mar. 16, 1976

[30] Foreign Application Priority Data

Sep. 15, 1975 United Kingdom ............... 37848/75

[51] Int. Cl.² ............................................. G11B 17/06
[52] U.S. Cl. .................................... 358/128; 274/13 R
[58] Field of Search ...................... 178/6.6 R, 6.6 DD; 179/100.4 R; 274/37, 38, 23; 358/128

[56] References Cited

U.S. PATENT DOCUMENTS

| 2,965,378 | 12/1960 | Assie | 274/37 |
| 3,843,846 | 10/1974 | Miller | 179/100.4 M |
| 3,870,835 | 3/1975 | Stave | 179/100.4 R |
| 3,952,145 | 4/1976 | Allen | 178/6.6 R |

FOREIGN PATENT DOCUMENTS 1,160,662  1/1964  Germany .............................. 274/23

*Primary Examiner*—John H. Wolff
*Attorney, Agent, or Firm*—Eugene M. Whitacre; William H. Meagher; Dilip A. Kulkarni

[57] ABSTRACT

A video disc player for playing back prerecorded signals from a spirally-grooved and rotatable record includes a carriage mounted for lateral motion relative to a base plate of the player in correlation with lateral motion of a groove-riding stylus during playback. A stylus arm supported at one end within the carriage carries a stylus at the free end thereof. One end of a leaf spring for urging the stylus into the record groove is secured to the stylus. The second end of the leaf spring is mounted within the carriage above the stylus. The leaf spring (1) provides stylus tracking pressure, (2) properly locates the free end of the stylus arm relative to the carriage, (3) establishes electrical connection between an electrode on the stylus and signal processing circuitry of the player.

7 Claims, 6 Drawing Figures

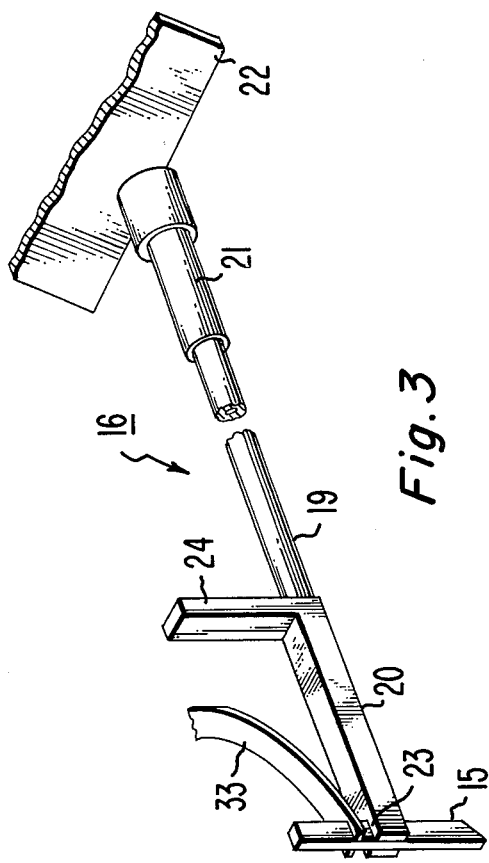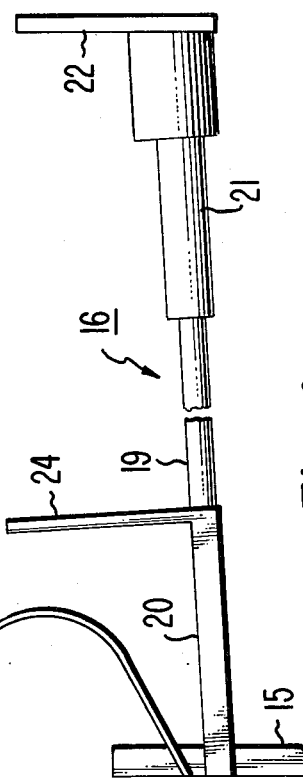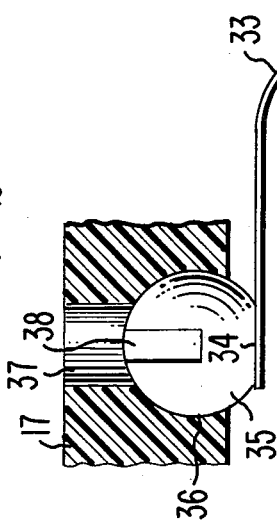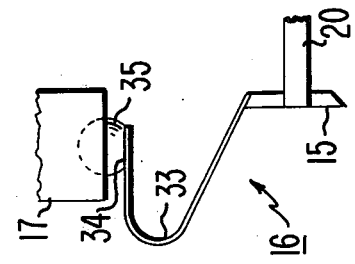

VIDEO DISC PLAYER EMPLOYING A SPRING LOADED STYLUS APPARATUS

The invention relates to a spring loaded stylus apparatus for a video disc player.

A video disc system of the type described in the U.S. Pat. No. 3,842,194, generally utilize records having groove densities of the order of four to eight thousand groove convolutions per inch. A typical video record of this type may have a groove convolution spacing of the order of 3.5 microns. The fragile walls of relatively narrow record grooves cannot be dependably relied upon to pull a stylus arm unit, around the compliant member, across the entire recorded surface of the record. Also, in video disc systems of the type described in abovesaid patent, it is desirable for accurate reproduction of the prerecorded signals that the stylus electrode maintain a substantially constant attitude in the record groove during playback. Therefore, a lateral feed drive mechanism is provided for traversing a carriage supporting the stylus arm unit in proper time relationship with the lateral motion of the stylus due to the spiral groove so as to continuously maintain the longitudinal axis of the stylus arm substantially tangential to the spiral groove at the point of stylus/groove engagement during playback. The U.S. Pat. No. 3,870,835, issued on Mar. 11, 1975 to Frederick R. Stave, illustrates such a lateral feed drive mechanism.

The stylus needs a certain tracking force to assure proper tracking and seating of the stylus in the record groove during playback. Typically, all the tracking force comes from the weight of the stylus arm unit, and the tracking is, essentially, mass controlled along the record groove and up-and-down on any defect in the record groove.

In accordance with the principles of the present invention, a stylus arm unit having a mass lower than that required for desirable tracking force is provided, and a spring connected between the stylus and the carriage provides the desired tracking force. It has been found that such an arrangement substantially reduces signal drop-outs during playback, because the leaf spring causes the stylus to quickly return to the record groove when the stylus is launched in space by a defect in the record groove.

In addition to providing stylus tracking force, the stylus spring may serve to properly locate the free end of the stylus arm relative to the carriage, and to establish electrical connection between an electrode on the stylus and signal processing circuit of the player.

Different systems have been heretofore tried to provide spring loading. Many of these systems employ a coil spring stretched between the stylus arm and a supporting structure. These systems, however, have proved unsatisfactory because they tend to bend the stylus arm setting up undesired oscillations therein and causing mistracking of the stylus. The problem is particularly acute where the stylus arm unit is extremely fragile and lightweight and where the tracking speed is relatively high. The apparatus of the present invention overcomes aforesaid problems.

In the accompanying drawings:

FIG. 3 is a perspective view of a stylus arm unit to which the spring loaded stylus of FIGS. 1 and 2 is secured;

FIG. 4 is a side view of the stylus arm unit showing the spring loaded stylus apparatus;

FIG. 5 is a front view of the stylus arm unit of FIGS. 3 and 4; and

FIG. 6 is a side view of a portion of another embodiment of the spring loaded stylus apparatus of the present invention.

Figure 1:
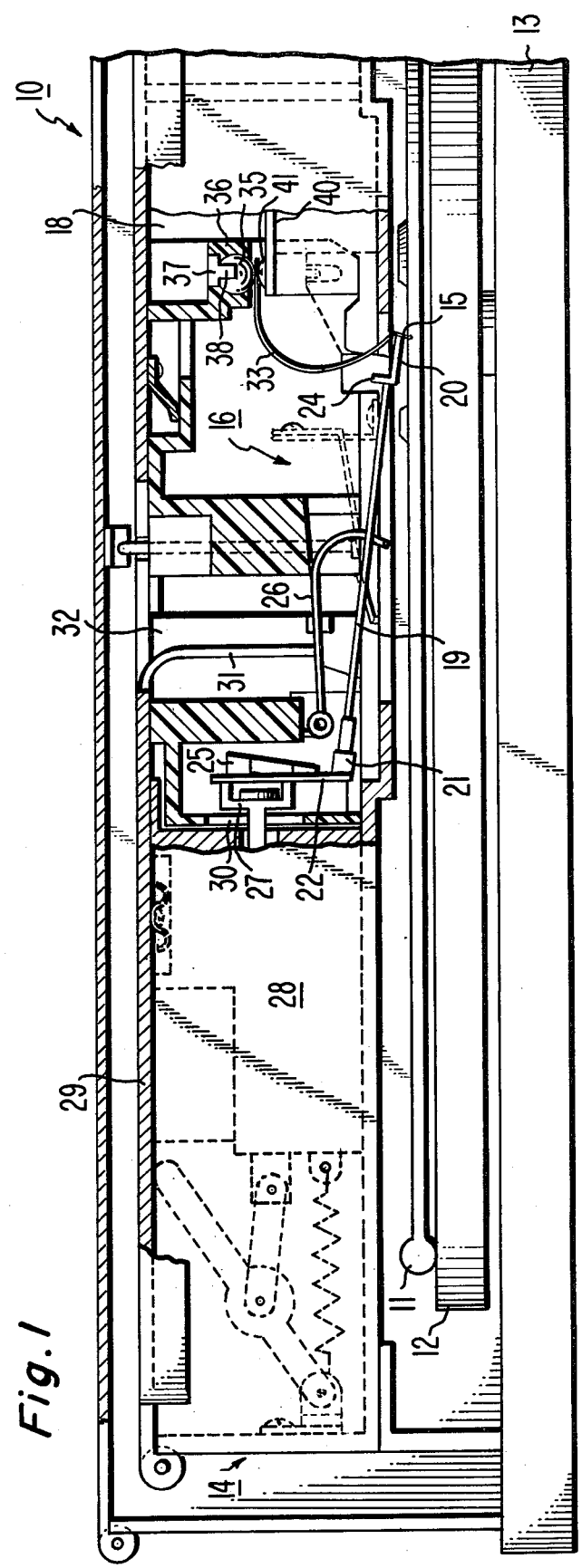
FIG. 1 is a video disc player incorporating a spring loaded stylus apparatus embodying the present invention.

In FIG. 1, numeral 10 indicates a video disc player of the general type shown in U.S. Pat. No. 3,842,194 (Clemens). A record 11 is rotatably mounted for playback on a turntable 12 secured to a motorboard 13 of the player. A carriage 14 is mounted for lateral motion relative to the motorboard 13 in correlation with lateral motion of a stylus 15 riding in a spiral groove disposed on the surface of the disc record 11 during playback.

Figure 2:
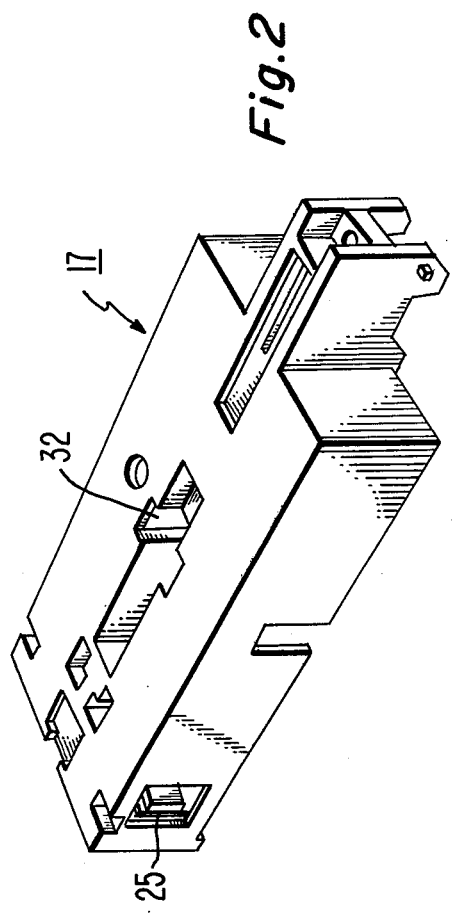
FIG. 2 is a perspective view of a cartridge in which the spring loaded stylus apparatus of FIG. 1 is housed.

A stylus arm unit 16 is housed in a cartridge 17. The cartridge 17 is received in a compartment 18 provided in the cartridge 14. FIG. 2 shows a perspective view of the cartridge 17.

As can be seen from FIG. 3, the stylus arm unit 16 comprises a stylus arm 19 formed with an aluminum tube (e.g., 0.024 inch outer diameter and 0.002 inch thickness) with a plastic stylus holder 20 glued at one end of the stylus arm and a compliant member 21 inserted molded at the other end of the stylus arm. The compliant member 21 exhibits high compliance to low frequency motion of the stylus arm 19 (e.g., due to record warpage, eccentricity, etc.). The stylus holder 20 has lower compliance than the compliant member 21, but exhibits relatively high compliance to high frequency motion of the stylus arm 19 (e.g., due to "orange peel" type record surface).

The compliant member 21 is in substantially unstressed condition when it is aligned with the stylus arm 19. A connector plate 22 is glued to the compliant member 21 in a manner that establishes 94° angle therebetween. The plastic stylus holder 20 contains a slot 23 in which the stylus 15 is glued in place. A small projection is molded at the top of the plastic stylus holder 20 to engage with an abutment to relieve the stylus 15 from a locked groove. The copending U.S. Patent Ser. No 667,308, of M. A. Leedom, entitled "PICKUP CARTRIDGE", filed concurrently herewith, illustrates such as locked groove relief arrangement. The Leedom application has been assigned of record to the assignee of the instant application.

The stylus arm unit 16 is suspended in the cartridge 17 by an elastic diaphragm 25 as shown in FIGS. 1 and 2. A U-shaped spring 26 releasably clamps the stylus arm 19 in a retracted position in the cartridge 17 during storage and handling of the cartridge (i.e., while the cartridge is outside the compartment 18). The retracted position provides a location for the stylus 15 withdrawn within the confines of the cartridge 17 remote from an opening in the bottom wall of the cartridge through which the stylus may protrude (e.g., during playback).

A support member 27 of an armstretcher apparatus 28 engages the connector plate 22 during the containment of the cartridge 17 in the compartment 18. The armstretcher 28 is slidably mounted in the compartment 18 for movement between a withdrawn position when a lid 29 of the carriage 14 is open to an advanced position when the carriage lid is closed in response to the motion of the carriage lid. The support member 27 enters the interior of the carriage 17 through an opening 30 in the cartridge to engage the connector plate 22 when the armstretcher 28 is advanced. The U.S. Pat. No. 3,711,641 illustrates such as armstretcher apparatus.

A spring defeat lever 31, secured to the carriage lid 29, enters the interior of the cartridge 17 through an opening 32 in the cartridge to defeat the clamping spring 26 during containment of the cartridge in the compartment 18 upon closure of the carriage lid.

The cartridge 17 further includes a leaf spring 33, in the form of a ribbon, for urging the stylus 15 in the record groove to establish stylus tracking pressure during playback as shown in FIG. 1. The first end of the leaf spring 33 is secured to the stylus 15 as shown in FIGS. 1, 3, and 4. The second end of the leaf spring 33 is secured to a flat 34 on a portion of a ball 35 as shown in FIGS. 1, 4, and 5. The ball 35 is friction loaded into a socket 36 provided in the cartridge 17 so that the flat portion protrudes from the socket. The cartridge 17 has an access opening 37 in communication with the socket 36 for inserting a tool into a hex-shaped hole 38 provided in the ball 35 for the purpose of adjustment of the stylus. Such adjustment may, for example, serve to center the stylus arm 19 in the cartridge 17 or to vary the stylus/record tracking pressure. After such adjustment at the factory, the ball 35 may be firmly glued in place.

The stylus adjusting apparatus is of the type described in a copending U.S. Patent Application Ser. No. 667,396, of B. K. Taylor, et al., entitled "STYLUS ADJUSTMENT APPARATUS FOR A VIDEO DISC PLAYER", filed concurrently herewith. The Taylor, et al, application has been assigned of record to the assignee of the instant application.

The second end of the leaf spring 33 is located so that the stylus arm 19 is normally aligned with the compliant member 21. As previously indicated, the compliant member 21 is in substantially unstressed condition when it is aligned with the stylus arm 19. Alignment of the compliant member 21 with the stylus arm 19 is advantageous because it prevents formation of a "set" in the compliant member which may interfere with the ability of the stylus 15 to track the record groove.

FIG. 6 is a side view of a portion of another embodiment of the spring loaded stylus apparatus in which the leaf spring 33 is bowed in a direction opposite that shown in the embodiment of FIGS. 1-5.

Where the stylus 15 incorporates an electrode for detecting signal variations in the spiral groove in the record 11 during playback, the leaf spring may be made of conductive material to provide an electrical connection between the stylus electrode and the signal processing circuitry 40 (FIG. 1) of the video disc player 10. In that case, the first end of the leaf spring 33 is secured to the stylus 15 in a manner that establishes electrical connection between the leaf spring and the stylus electrode. The signal processing circuitry 40 has an input terminal 41 which contacts the second end of the leaf spring 33 during containment of the cartridge 17 in the compartment 18 to establish the abovementioned electrical connection.

The cartridge may be of the type described in the copending U.S. Pat. Application Ser. No. 667,308, of M. A. Leedom, entitled "PICKUP CARTRIDGE", filed concurrently herewith.

What is claimed is:

1. In a system for playing back prerecorded signals from a spirally-grooved record rotatably mounted on a turntable by a groove-riding stylus secured to one end of a stylus arm; said system including a base plate; an apparatus comprising:
   a carriage mounted for lateral motion relative to said base plate in correlation with lateral motion of said groove-riding stylus;
   means for supporting the end of said stylus arm remote from said one end within said carriage;
   a spring for urging said stylus into said record groove during playback; said spring having a first end and a second end; said first end of said spring being secured to said stylus; and
   means for securing said second end of said spring within said carriage for movement therewith.

2. In a system for playing back prerecorded signals from a spirally-grooved record rotatably mounted on a turntable by a groove-riding stylus secured to one end of a stylus arm; said system including a base plate; an apparatus comprising:
   a carriage mounted for lateral motion relative to said base plate in correlation with lateral motion of said groove-riding stylus;
   means for supporting the end of said stylus arm remote from said one end within said carriage;
   a leaf spring for urging said stylus into said record groove during playback; said leaf spring having a first end and a second end; said first end of said leaf spring being secured to said stylus;
   means for securing said second end of said leaf spring within said carriage for movement therewith; and
   said securing of said second end of said leaf spring within said carriage being such that said leaf spring is disposed in a bowed configuration.

3. In a system for playing back prerecorded signals from a spirally-grooved record rotatably mounted on a turntable by a groove-riding stylus secured to one end of a stylus arm; said system including a base plate; an apparatus comprising:
   a carriage mounted for lateral motion relative to said base plate in correlation with lateral motion of said groove-riding stylus;
   means for supporting the end of said stylus arm remote from said one end within said carriage;
   a spring for urging said stylus into said record groove during playback; said spring having a first end and a second end; said first end of said spring being secured to said stylus;
   means for securing said second end of said spring within said carriage for movement therewith; and
   said system including a signal processing circuit having an input terminal located within said carriage; said spring being made of conductive material; said second end of said spring being connected to said input terminal; said stylus having an electrode; said securing of said first end of said spring to said stylus effecting an electrical connection between said first end and said electrode to establish an electrical path between said stylus electrode and said signal processing circuit via said spring.

4. In a system for playing back prerecorded signals from a spirally-grooved record rotatably mounted on a turntable by a groove-riding stylus secured to one end of a stylus arm; said system including a base plate; an apparatus comprising:
   A a carriage mounted for lateral motion relative to said base plate in correlation to lateral motion of said groove-riding stylus;
   B. a compliant member securing the other end of said stylus arm within said carriage;

C. means for causing lateral motion of said carriage during playback in correlation with said lateral motion of said groove-riding stylus due to the spiral groove so that said stylus arm is maintained substantially tangential to said groove at the point of the stylus/groove engagement;

D. a spring for urging said stylus into said record during playback; said spring having a first end and a second end; said first end of said spring being secured to said stylus; and E. means for securing said second end of said spring within said carriage above said stylus so that said stylus arm is normally aligned wih said compliant member.

5. In a system for playing back prerecorded signals from a spirally-grooved record rotatably mounted on a turntable by a groove-riding stylus secured to one end of a stylus arm; said system including a base plate; an apparatus comprising:

A. a carriage mounted for lateral motion relative to said base plate in correlation to lateral motion of said groove-riding stylus;

B. a compliant member securing the other end of said stylus arm within said carriage;

C. means for causing lateral motion of said carriage during playback in correlation with said lateral motion of said groove-riding stylus due to the spiral groove so that said stylus arm is maintaind substantially tangential to said groove at the point of the stylus/groove engagement;

D. a spring for urging said stylus into said record groove during playback; said spring having a first end and a second end; said first end of said spring being secured to said stylus;

E. means for securing said second end of said spring within said carriage above said stylus so that said stylus arm is normally aligned with said compliant member; and said system including a signal processing circuit having an input terminal located within said carriage; said spring being made of conductive material; said second end of said spring being connected to said input terminal; said stylus having an electrode; said securing of said first end of said spring to said stylus effecting an electrical connection between said first end and said electrode to establish an electrical path between said stylus electrode and said signal processing circuit via said spring.

6. A pickup cartridge for grooved video records comprising:

A. a housing having a bottom adapted to be supported adjacent a video record;

B. a stylus arm assembly including:
 a. a substantially straight and elongated stylus arm;
 b. a compliant member for supporting one end of said stylus arm within, and closely adjacent to, said housing bottom;
 c. a stylus holder for securing a groove-engaging stylus to the other end of said stylus arm;
 said compliant member exhibiting relatively high compliance to low frequency motion of said stylus arm;
 said stylus holder having a lower compliance than said compliant member, but said stylus holder exhibiting relatively high compliance to high frequency motion of said stylus arm; and
 the mass of said stylus arm assembly being insufficient to provide the desired tracking force as a function of gravity to track said video record; and C. a spring connected between said stylus and said housing to provide the desired tracking force.

7. A cartridge as defined in claim 6 wherein said stylus includes a conductive electrode for detecting signals recorded on said video record; wherein said spring being conductive; wherein said connector between said spring and said stylus serves to establish an electrical path from said stylus electrode via said conductive spring.

* * * * *